United States Patent
Sampsell

(10) Patent No.: US 7,813,026 B2
(45) Date of Patent: Oct. 12, 2010

(54) SYSTEM AND METHOD OF REDUCING COLOR SHIFT IN A DISPLAY

(75) Inventor: Jeffrey B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 3 days.

(21) Appl. No.: 11/041,020

(22) Filed: Jan. 21, 2005

(65) Prior Publication Data

US 2006/0077514 A1    Apr. 13, 2006

Related U.S. Application Data

(60) Provisional application No. 60/613,482, filed on Sep. 27, 2004.

(51) Int. Cl.
G02B 26/00    (2006.01)
(52) U.S. Cl. .................. 359/290; 359/291; 359/292
(58) Field of Classification Search .......... 359/290, 359/291, 295, 245, 247, 214, 223, 224, 260, 359/298, 248, 321, 486, 487, 292
See application file for complete search history.

(56) References Cited

U.S. PATENT DOCUMENTS

| | | |
|---|---|---|
| 2,518,647 A | 8/1950 | Teeple et al. |
| 2,534,846 A | 12/1950 | Ambrose et al. |
| 3,439,973 A | 4/1969 | Paul et al. |
| 3,443,854 A | 5/1969 | Weiss |
| 3,448,334 A | 6/1969 | Frost |
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,886,310 A | 5/1975 | Guldberg et al. |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,287,449 A | 9/1981 | Takeda et al. |
| 4,377,324 A | 3/1983 | Durand et al. |
| 4,389,096 A | 6/1983 | Hori et al. |

(Continued)

FOREIGN PATENT DOCUMENTS

DE    34 02 746    8/1985

(Continued)

OTHER PUBLICATIONS

XP 000657155, May 23, 1995, Tai.

(Continued)

*Primary Examiner*—Ricky L Mack
*Assistant Examiner*—Brandi N Thomas
(74) *Attorney, Agent, or Firm*—Knobbe Martens Olson & Bear, LLP

(57) ABSTRACT

A system and method of reducing color shift in a display includes an interferometric modulator display configured to reflect light from at least one light source and through at least one converging optical element in an optical path from the light source to a viewer via the display. In one embodiment, the converging optical element comprises a diffractive optical element.

22 Claims, 9 Drawing Sheets

U.S. PATENT DOCUMENTS

| | | | |
|---|---|---|---|
| 4,403,248 A | 9/1983 | te Velde | |
| 4,441,791 A | 4/1984 | Hornbeck | |
| 4,445,050 A | 4/1984 | Marks | |
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,531,126 A | 7/1985 | Sadones | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,662,746 A | 5/1987 | Hornbeck | |
| 4,663,083 A | 5/1987 | Marks | |
| 4,681,403 A | 7/1987 | te Velde et al. | |
| 4,710,732 A | 12/1987 | Hornbeck | |
| 4,748,366 A | 5/1988 | Taylor | |
| 4,786,128 A | 11/1988 | Birnbach | |
| 4,790,635 A | 12/1988 | Apsley | |
| 4,850,682 A | 7/1989 | Gerritsen | |
| 4,856,863 A | 8/1989 | Sampsell et al. | |
| 4,859,060 A | 8/1989 | Katagari et al. | |
| 4,900,395 A | 2/1990 | Syverson et al. | |
| 4,918,577 A | 4/1990 | Furudate | |
| 4,937,496 A | 6/1990 | Neiger et al. | |
| 4,954,789 A | 9/1990 | Sampsell | |
| 4,956,619 A | 9/1990 | Hornbeck | |
| 4,982,184 A | 1/1991 | Kirkwood | |
| 5,018,256 A | 5/1991 | Hornbeck | |
| 5,022,745 A | 6/1991 | Zahowski et al. | |
| 5,028,939 A | 7/1991 | Hornbeck et al. | |
| 5,037,173 A | 8/1991 | Sampsell et al. | |
| 5,044,736 A | 9/1991 | Jaskie et al. | |
| 5,061,049 A | 10/1991 | Hornbeck | |
| 5,075,796 A | 12/1991 | Schildkraut et al. | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,136,669 A | 8/1992 | Gerdt | |
| 5,142,405 A | 8/1992 | Hornbeck | |
| 5,142,414 A | 8/1992 | Koehler | |
| 5,153,771 A | 10/1992 | Link et al. | |
| 5,162,787 A | 11/1992 | Thompson et al. | |
| 5,164,858 A | 11/1992 | Aguilera, Jr. et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,212,582 A | 5/1993 | Nelson | |
| 5,214,419 A | 5/1993 | DeMond et al. | |
| 5,214,420 A | 5/1993 | Thompson et al. | |
| 5,216,537 A | 6/1993 | Hornbeck | |
| 5,226,099 A | 7/1993 | Mignardi et al. | |
| 5,228,013 A | 7/1993 | Bik et al. | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,254,980 A | 10/1993 | Hendrix et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,287,096 A | 2/1994 | Thompson et al. | |
| 5,293,272 A | 3/1994 | Jannson et al. | |
| 5,296,950 A | 3/1994 | Lin et al. | |
| 5,305,640 A | 4/1994 | Boysel et al. | |
| 5,311,360 A | 5/1994 | Bloom et al. | |
| 5,312,513 A | 5/1994 | Florence et al. | |
| 5,323,002 A | 6/1994 | Sampsell et al. | |
| 5,324,683 A | 6/1994 | Fitch et al. | |
| 5,325,116 A | 6/1994 | Sampsell | |
| 5,326,426 A | 7/1994 | Tam et al. | |
| 5,326,430 A | 7/1994 | Cronin et al. | |
| 5,327,286 A | 7/1994 | Sampsell et al. | |
| 5,331,454 A | 7/1994 | Hornbeck | |
| 5,339,116 A | 8/1994 | Urbanus et al. | |
| 5,345,322 A | 9/1994 | Fergason et al. | |
| 5,345,328 A | 9/1994 | Fritz et al. | |
| 5,358,601 A | 10/1994 | Cathey | |
| 5,365,283 A | 11/1994 | Doherty et al. | |
| 5,381,232 A | 1/1995 | Van Wijk | |
| 5,381,253 A | 1/1995 | Sharp et al. | |
| 5,398,125 A | 3/1995 | Willett et al. | |
| 5,401,983 A | 3/1995 | Jokerst et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,452,385 A | 9/1995 | Izumi | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,459,610 A | 10/1995 | Bloom et al. | |
| 5,461,411 A | 10/1995 | Florence et al. | |
| 5,467,417 A | 11/1995 | Nakamura | |
| 5,474,865 A | 12/1995 | Vasudev | |
| 5,481,385 A | 1/1996 | Zimmerman et al. | |
| 5,489,952 A | 2/1996 | Gove et al. | |
| 5,497,172 A | 3/1996 | Doherty et al. | |
| 5,497,197 A | 3/1996 | Gove et al. | |
| 5,499,062 A | 3/1996 | Urbanus | |
| 5,500,635 A | 3/1996 | Mott | |
| 5,500,761 A | 3/1996 | Goossen et al. | |
| 5,506,597 A | 4/1996 | Thompson et al. | |
| 5,515,076 A | 5/1996 | Thompson et al. | |
| 5,515,184 A | 5/1996 | Caulfield | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,327 A | 6/1996 | Cordova, Jr. | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,552,925 A | 9/1996 | Worley | |
| 5,563,398 A | 10/1996 | Sampsell | |
| 5,567,334 A | 10/1996 | Baker et al. | |
| 5,569,565 A | 10/1996 | Kawakami | |
| 5,570,135 A | 10/1996 | Gove et al. | |
| 5,579,149 A | 11/1996 | Moret et al. | |
| 5,581,272 A | 12/1996 | Conner et al. | |
| 5,583,688 A | 12/1996 | Hornbeck | |
| 5,589,852 A | 12/1996 | Thompson et al. | |
| 5,594,830 A | 1/1997 | Winston | |
| 5,597,736 A | 1/1997 | Sampsell | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,619,059 A | 4/1997 | Li et al. | |
| 5,619,365 A | 4/1997 | Rhoades et al. | |

| | | | | | | |
|---|---|---|---|---|---|---|
| 5,619,366 | A | 4/1997 | Rhoads et al. | 6,160,833 A | 12/2000 | Floyd et al. |
| 5,629,790 | A | 5/1997 | Neukermans et al. | 6,180,428 B1 | 1/2001 | Peeters et al. |
| 5,633,652 | A | 5/1997 | Kanbe et al. | 6,195,196 B1 | 2/2001 | Kimura et al. |
| 5,636,052 | A | 6/1997 | Arney et al. | 6,196,691 B1 | 3/2001 | Ochiai |
| 5,636,185 | A | 6/1997 | Brewer et al. | 6,201,633 B1 | 3/2001 | Peeters et al. |
| 5,638,084 | A | 6/1997 | Kalt | 6,211,976 B1 | 4/2001 | Popovich |
| 5,638,946 | A | 6/1997 | Zavracky et al. | 6,232,936 B1 | 5/2001 | Gove et al. |
| 5,641,391 | A | 6/1997 | Hunter et al. | 6,232,937 B1 | 5/2001 | Jacobsen |
| 5,646,768 | A | 7/1997 | Kaeriyama | 6,243,149 B1 | 6/2001 | Swanson et al. |
| 5,647,036 | A | 7/1997 | Deacon et al. | 6,259,082 B1 | 7/2001 | Fujimoto et al. |
| 5,650,865 | A | 7/1997 | Smith | 6,282,010 B1 | 8/2001 | Sulzbach et al. |
| 5,650,881 | A | 7/1997 | Hornbeck | 6,288,824 B1 | 9/2001 | Kastalsky |
| 5,654,741 | A | 8/1997 | Sampsell et al. | 6,295,154 B1 | 9/2001 | Laor et al. |
| 5,657,099 | A | 8/1997 | Doherty et al. | 6,301,000 B1 | 10/2001 | Johnson |
| 5,659,374 | A | 8/1997 | Gale, Jr. et al. | 6,323,982 B1 | 11/2001 | Hornbeck |
| 5,659,410 | A | 8/1997 | Koike | 6,342,970 B1 | 1/2002 | Sperger et al. |
| 5,665,997 | A | 9/1997 | Weaver et al. | 6,356,378 B1 | 3/2002 | Huibers |
| 5,671,314 | A | 9/1997 | Gregory et al. | 6,381,022 B1 | 4/2002 | Zavracky et al. |
| 5,673,139 | A | 9/1997 | Johnson | 6,412,969 B1 | 7/2002 | Toriharal. |
| 5,683,591 | A | 11/1997 | Offenberg | 6,447,126 B1 | 9/2002 | Hornbeck |
| 5,703,667 | A | 12/1997 | Ochiai | 6,465,355 B1 | 10/2002 | Horsley |
| 5,703,710 | A | 12/1997 | Brinkman et al. | 6,466,354 B1 | 10/2002 | Gudeman |
| 5,710,656 | A | 1/1998 | Goosen | 6,466,358 B2 | 10/2002 | Tew |
| 5,726,480 | A | 3/1998 | Pister | 6,473,274 B1 | 10/2002 | Maimone et al. |
| 5,735,590 | A | 4/1998 | Kashima | 6,480,177 B2 | 11/2002 | Doherty et al. |
| 5,739,945 | A | 4/1998 | Tayebati | 6,483,613 B1 | 11/2002 | Woodgate et al. |
| 5,745,193 | A | 4/1998 | Urbanus et al. | 6,493,475 B1 | 12/2002 | Lin |
| 5,745,281 | A | 4/1998 | Yi et al. | 6,496,122 B2 | 12/2002 | Sampsell |
| 5,771,116 | A | 6/1998 | Miller et al. | 6,520,643 B1 | 2/2003 | Holman |
| 5,774,321 | A | 6/1998 | Stern | 6,522,794 B1 | 2/2003 | Bischel et al. |
| 5,784,190 | A | 7/1998 | Worley | 6,538,813 B1 | 3/2003 | Magno et al. |
| 5,784,212 | A | 7/1998 | Hornbeck | 6,545,335 B1 | 4/2003 | Chua et al. |
| 5,793,504 | A | 8/1998 | Stoll | 6,548,908 B2 | 4/2003 | Chua et al. |
| 5,805,117 | A | 9/1998 | Mazurek | 6,549,338 B1 | 4/2003 | Wolverton et al. |
| 5,808,780 | A | 9/1998 | McDonald | 6,552,840 B2 | 4/2003 | Knipe |
| 5,810,464 | A | 9/1998 | Ishikawa | 6,570,584 B1 | 5/2003 | Cok et al. |
| 5,815,229 | A | 9/1998 | Shapiro et al. | 6,574,033 B1 | 6/2003 | Chui et al. |
| 5,818,095 | A | 10/1998 | Sampsell | 6,577,429 B1 | 6/2003 | Kurtz |
| 5,825,528 | A | 10/1998 | Goosen | 6,589,625 B1 | 7/2003 | Kothari et al. |
| 5,835,255 | A | 11/1998 | Miles | 6,597,419 B1 | 7/2003 | Okada et al. |
| 5,842,088 | A | 11/1998 | Thompson | 6,598,987 B1 | 7/2003 | Parikka |
| 5,854,872 | A | 12/1998 | Tai | 6,600,201 B2 | 7/2003 | Hartwell et al. |
| 5,877,874 | A | 3/1999 | Rosenberg | 6,606,175 B1 | 8/2003 | Sampsell et al. |
| 5,892,598 | A | 4/1999 | Asakawa | 6,624,944 B1 | 9/2003 | Wallace et al. |
| 5,912,758 | A | 6/1999 | Knipe et al. | 6,625,047 B2 | 9/2003 | Coleman, Jr. |
| 5,913,594 | A | 6/1999 | Iimura | 6,630,786 B2 | 10/2003 | Cummings et al. |
| 5,914,804 | A | 6/1999 | Goosen | 6,632,698 B2 | 10/2003 | Ives |
| 5,920,417 | A | 7/1999 | Johnson | 6,636,322 B1 | 10/2003 | Terashita |
| 5,933,183 | A | 8/1999 | Enomoto | 6,636,653 B2 | 10/2003 | Miracky |
| 5,943,158 | A | 8/1999 | Ford et al. | 6,642,913 B1 | 11/2003 | Kimura et al. |
| 5,959,763 | A | 9/1999 | Bozler et al. | 6,643,069 B2 | 11/2003 | Dewald |
| 5,982,540 | A | 11/1999 | Koike | 6,646,772 B1 | 11/2003 | Popovich et al. |
| 5,986,796 | A | 11/1999 | Miles | 6,650,455 B2 | 11/2003 | Miles |
| 5,991,073 | A | 11/1999 | Woodgate et al. | 6,666,561 B1 | 12/2003 | Blakley |
| 5,999,239 | A | 12/1999 | Larson | 6,674,090 B1 | 1/2004 | Chua et al. |
| 6,002,829 | A | 12/1999 | Winston | 6,674,562 B1 | 1/2004 | Miles |
| 6,014,192 | A | 1/2000 | Lehureau | 6,680,792 B1 | 1/2004 | Miles |
| 6,028,690 | A | 2/2000 | Carter et al. | 6,683,693 B1 | 1/2004 | Tsuka et al. |
| 6,031,653 | A | 2/2000 | Wang et al. | 6,710,908 B2 | 3/2004 | Miles et al. |
| 6,038,056 | A | 3/2000 | Florence et al. | 6,738,194 B1 | 5/2004 | Ramirez et al. |
| 6,040,937 | A | 3/2000 | Miles | 6,741,377 B2 | 5/2004 | Miles |
| 6,046,840 | A | 4/2000 | Huibers | 6,741,384 B1 | 5/2004 | Martin et al. |
| 6,048,071 | A | 4/2000 | Sawayama | 6,741,503 B1 | 5/2004 | Farris et al. |
| 6,049,317 | A | 4/2000 | Thompson et al. | 6,747,785 B2 | 6/2004 | Chen et al. |
| 6,055,090 | A | 4/2000 | Miles | 6,747,800 B1 | 6/2004 | Lin |
| 6,061,075 | A | 5/2000 | Nelson et al. | 6,760,135 B1 | 7/2004 | Payne |
| 6,072,620 | A | 6/2000 | Shiono | 6,773,126 B1 | 8/2004 | Hatjasalo |
| 6,073,034 | A | 6/2000 | Jacobsen | 6,775,174 B2 | 8/2004 | Huffman et al. |
| 6,088,102 | A | 7/2000 | Manhart | 6,778,155 B2 | 8/2004 | Doherty et al. |
| 6,099,132 | A | 8/2000 | Kaeriyama | 6,794,119 B2 | 9/2004 | Miles |
| 6,100,872 | A | 8/2000 | Aratani et al. | 6,798,469 B2 | 9/2004 | Kimura |
| 6,113,239 | A | 9/2000 | Sampsell et al. | 6,811,267 B1 | 11/2004 | Allen et al. |
| 6,147,790 | A | 11/2000 | Meier et al. | 6,819,469 B1 | 11/2004 | Koba |

| | | | | | |
|---|---|---|---|---|---|
| 6,822,628 B2 | 11/2004 | Dunphy et al. | 2002/0180915 A1 | 12/2002 | Kashima |
| 6,822,745 B2 | 11/2004 | De Groot | 2002/0191130 A1 | 12/2002 | Liang et al. |
| 6,822,780 B1 | 11/2004 | Long, Jr. | 2003/0011864 A1 | 1/2003 | Flanders |
| 6,829,132 B2 | 12/2004 | Martin et al. | 2003/0016930 A1 | 1/2003 | Inditsky |
| 6,841,787 B2 | 1/2005 | Almogy | 2003/0043157 A1 | 3/2003 | Miles |
| 6,853,129 B1 | 2/2005 | Cummings et al. | 2003/0067760 A1 | 4/2003 | Jagt |
| 6,855,610 B2 | 2/2005 | Tung et al. | 2003/0072070 A1 | 4/2003 | Miles |
| 6,859,218 B1 | 2/2005 | Luman et al. | 2003/0081154 A1 | 5/2003 | Coleman |
| 6,861,277 B1 | 3/2005 | Monroe et al. | 2003/0095401 A1 | 5/2003 | Hanson |
| 6,862,022 B2 | 3/2005 | Slupe | 2003/0103177 A1 | 6/2003 | Maeda |
| 6,862,029 B1 | 3/2005 | D'Souza et al. | 2003/0136759 A1 | 7/2003 | Mikolas |
| 6,867,896 B2 | 3/2005 | Miles | 2003/0151821 A1 | 8/2003 | Favalora et al. |
| 6,870,581 B2 | 3/2005 | Li et al. | 2003/0160913 A1 | 8/2003 | Suzuki et al. |
| 6,870,654 B2 | 3/2005 | Lin et al. | 2003/0160919 A1 | 8/2003 | Suzuki et al. |
| 6,880,959 B2 | 4/2005 | Houston | 2003/0161040 A1 | 8/2003 | Ishii |
| 6,882,458 B2 | 4/2005 | Lin et al. | 2003/0169385 A1 | 9/2003 | Okuwaki |
| 6,882,461 B1 | 4/2005 | Tsai et al. | 2003/0179383 A1 | 9/2003 | Chen et al. |
| 6,912,022 B2 | 6/2005 | Lin et al. | 2003/0184690 A1 | 10/2003 | Ogiwara |
| 6,930,816 B2 | 8/2005 | Mochizuki | 2003/0193630 A1 | 10/2003 | Chiou |
| 6,940,653 B2 | 9/2005 | Favalora | 2003/0202264 A1 | 10/2003 | Weber et al. |
| 6,952,303 B2 | 10/2005 | Lin et al. | 2003/0202265 A1 | 10/2003 | Reboa et al. |
| 6,958,847 B2 | 10/2005 | Lin | 2003/0202266 A1 | 10/2003 | Ring et al. |
| 6,967,779 B2 | 11/2005 | Fadel et al. | 2003/0206281 A1 | 11/2003 | Jain |
| 6,970,031 B1 | 11/2005 | Martin | 2003/0210222 A1 | 11/2003 | Ogiwara et al. |
| 6,972,891 B2 | 12/2005 | Patel et al. | 2003/0210363 A1 | 11/2003 | Yasukawa et al. |
| 6,999,236 B2 | 2/2006 | Lin et al. | 2003/0231483 A1 | 12/2003 | Higashiyama |
| 7,002,726 B2 | 2/2006 | Patel | 2004/0017599 A1 | 1/2004 | Yang |
| 7,009,754 B2 | 3/2006 | Huibers | 2004/0027315 A1 | 2/2004 | Senda et al. |
| 7,012,659 B2 | 3/2006 | Smith et al. | 2004/0032659 A1 | 2/2004 | Drinkwater |
| 7,018,088 B2 | 3/2006 | Yu | 2004/0051929 A1 | 3/2004 | Sampsell et al. |
| 7,030,949 B2 * | 4/2006 | Kashima ................... 349/115 | 2004/0058532 A1 | 3/2004 | Miles et al. |
| 7,042,643 B2 | 5/2006 | Miles | 2004/0070711 A1 | 4/2004 | Wen et al. |
| 7,056,001 B2 | 6/2006 | Chuang | 2004/0080807 A1 | 4/2004 | Chen et al. |
| 7,064,875 B2 | 6/2006 | Kawano et al. | 2004/0080938 A1 | 4/2004 | Holman et al. |
| 7,072,093 B2 | 7/2006 | Piehl et al. | 2004/0090765 A1 | 5/2004 | Yu |
| 7,072,096 B2 | 7/2006 | Holman et al. | 2004/0115339 A1 | 6/2004 | Ito |
| 7,110,158 B2 | 9/2006 | Miles | 2004/0125048 A1 | 7/2004 | Fukuda et al. |
| 7,113,339 B2 | 9/2006 | Taguchi et al. | 2004/0125281 A1 | 7/2004 | Lin et al. |
| 7,123,216 B1 | 10/2006 | Miles | 2004/0145049 A1 | 7/2004 | McKinnell et al. |
| 7,138,984 B1 | 11/2006 | Miles | 2004/0145811 A1 | 7/2004 | Lin et al. |
| 7,142,347 B2 | 11/2006 | Islam | 2004/0147056 A1 | 7/2004 | McKinnell et al. |
| 7,161,728 B2 | 1/2007 | Sampsell et al. | 2004/0147198 A1 | 7/2004 | Lin et al. |
| 7,161,730 B2 | 1/2007 | Floyd | 2004/0160143 A1 | 8/2004 | Shreeve et al. |
| 7,218,429 B2 | 5/2007 | Batchko | 2004/0174583 A1 | 9/2004 | Chen et al. |
| 7,262,916 B2 | 8/2007 | Kao | 2004/0175577 A1 | 9/2004 | Lin et al. |
| 7,342,705 B2 | 3/2008 | Chui et al. | 2004/0179281 A1 | 9/2004 | Reboa |
| 7,369,294 B2 | 5/2008 | Gally | 2004/0207897 A1 | 10/2004 | Lin |
| 7,372,631 B2 | 5/2008 | Ozawa | 2004/0207995 A1 | 10/2004 | Park |
| 7,379,227 B2 | 5/2008 | Miles | 2004/0209192 A1 | 10/2004 | Lin et al. |
| 7,380,970 B2 | 6/2008 | Hwang | 2004/0209195 A1 | 10/2004 | Lin |
| 7,456,805 B2 | 11/2008 | Ouderkirk | 2004/0212026 A1 | 10/2004 | Van Brocklin et al. |
| 7,508,571 B2 | 3/2009 | Gally | 2004/0217378 A1 | 11/2004 | Martin et al. |
| 7,564,612 B2 | 7/2009 | Chui | 2004/0217919 A1 | 11/2004 | Pichl et al. |
| 7,630,123 B2 | 12/2009 | Kothari | 2004/0218251 A1 | 11/2004 | Piehl et al. |
| 2001/0003487 A1 | 6/2001 | Miles | 2004/0218334 A1 | 11/2004 | Martin et al. |
| 2001/0003504 A1 | 6/2001 | Ishihara | 2004/0218341 A1 | 11/2004 | Martin et al. |
| 2001/0010952 A1 | 8/2001 | Abramovich | 2004/0218390 A1 | 11/2004 | Holman et al. |
| 2001/0019380 A1 | 9/2001 | Ishihara | 2004/0227493 A1 | 11/2004 | Van Brocklin et al. |
| 2001/0019479 A1 | 9/2001 | Nakabayashi et al. | 2004/0240032 A1 | 12/2004 | Miles |
| 2001/0030861 A1 | 10/2001 | Oda | 2004/0240138 A1 | 12/2004 | Martin et al. |
| 2001/0049061 A1 | 12/2001 | Nakagaki et al. | 2004/0245588 A1 | 12/2004 | Nikkel et al. |
| 2001/0055208 A1 | 12/2001 | Kimura | 2004/0246743 A1 | 12/2004 | Lee |
| 2002/0015215 A1 | 2/2002 | Miles | 2004/0263944 A1 | 12/2004 | Miles et al. |
| 2002/0024711 A1 | 2/2002 | Miles | 2005/0001828 A1 | 1/2005 | Martin et al. |
| 2002/0034071 A1 | 3/2002 | Mabuchi | 2005/0002082 A1 | 1/2005 | Miles |
| 2002/0054424 A1 | 5/2002 | Miles | 2005/0003667 A1 | 1/2005 | Lin et al. |
| 2002/0075555 A1 | 6/2002 | Miles | 2005/0024557 A1 | 2/2005 | Lin |
| 2002/0080465 A1 | 6/2002 | Han | 2005/0035699 A1 | 2/2005 | Tsai |
| 2002/0105699 A1 | 8/2002 | Miracky et al. | 2005/0036095 A1 | 2/2005 | Yeh et al. |
| 2002/0106182 A1 | 8/2002 | Kawashima | 2005/0036192 A1 | 2/2005 | Lin et al. |
| 2002/0126364 A1 * | 9/2002 | Miles ................. 359/247 | 2005/0038950 A1 | 2/2005 | Adelmann |
| 2002/0135560 A1 | 9/2002 | Akaoka | 2005/0042117 A1 | 2/2005 | Lin |
| 2002/0172039 A1 | 11/2002 | Inditsky | 2005/0046922 A1 | 3/2005 | Lin et al. |

| | | | | | | |
|---|---|---|---|---|---|---|
| 2005/0046948 A1 | 3/2005 | Lin | | EP | 0 907 050 | 4/1999 |
| 2005/0057442 A1 | 3/2005 | Way | | EP | 1014161 A | 6/2000 |
| 2005/0068583 A1 | 3/2005 | Gutkowski et al. | | EP | 1 089 115 A | 4/2001 |
| 2005/0068605 A1 | 3/2005 | Tsai | | EP | 1 089 115 A1 | 4/2001 |
| 2005/0068606 A1 | 3/2005 | Tsai | | EP | 1251454 A2 | 4/2002 |
| 2005/0069209 A1 | 3/2005 | Damera-Venkata et al. | | EP | 1251454 A3 | 4/2002 |
| 2005/0078348 A1 | 4/2005 | Lin | | EP | 1271223 A2 | 6/2002 |
| 2005/0133761 A1 | 6/2005 | Thielemans | | EP | 1341025 A1 | 9/2003 |
| 2005/0168849 A1 | 8/2005 | Lin | | EP | 1413543 A1 | 4/2004 |
| 2005/0179977 A1 | 8/2005 | Chui et al. | | EP | 1 437 610 | 7/2004 |
| 2005/0195462 A1 | 9/2005 | Lin | | EP | 1450418 A2 | 8/2004 |
| 2005/0195468 A1 | 9/2005 | Sampsell | | EP | 1519218 A1 | 8/2004 |
| 2005/0212738 A1 | 9/2005 | Gally | | EP | 1 544 537 | 6/2005 |
| 2005/0224694 A1 | 10/2005 | Yaung | | EP | 1 640314 | 3/2006 |
| 2005/0231977 A1 | 10/2005 | Hayakawa | | EP | 1 734 401 | 12/2006 |
| 2005/0259939 A1 | 11/2005 | Rinko | | FR | 2 760 559 | 9/1998 |
| 2006/0002141 A1 | 1/2006 | Ouderkirk | | FR | 2760559 A1 | 9/1998 |
| 2006/0051048 A1 | 3/2006 | Gardiner | | GB | 2 260 203 A | 4/1993 |
| 2006/0066511 A1 | 3/2006 | Chui | | GB | 2278222 A | 11/1994 |
| 2006/0066541 A1 | 3/2006 | Gally | | GB | 2321532 A | 7/1998 |
| 2006/0066557 A1 | 3/2006 | Floyd | | JP | 05 275401 | 10/1993 |
| 2006/0066586 A1 | 3/2006 | Gally | | JP | 405275401 A | 10/1993 |
| 2006/0066641 A1 | 3/2006 | Gally | | JP | 08 018990 | 1/1996 |
| 2006/0066783 A1 | 3/2006 | Sampsell | | JP | 08018990 A | 1/1996 |
| 2006/0066935 A1 | 3/2006 | Cummings et al. | | JP | 09 022012 | 1/1997 |
| 2006/0067600 A1 | 3/2006 | Gally | | JP | 09 281917 | 10/1997 |
| 2006/0067633 A1 | 3/2006 | Gally | | JP | 09281917 A | 10/1997 |
| 2006/0073623 A1 | 4/2006 | Conley | | JP | 10-202948 * | 4/1998 |
| 2006/0077122 A1 | 4/2006 | Gally | | JP | 10 202948 | 4/1998 |
| 2006/0077123 A1 | 4/2006 | Gally | | JP | 11 174234 | 7/1999 |
| 2006/0077124 A1 | 4/2006 | Gally | | JP | 11174234 A | 7/1999 |
| 2006/0077125 A1 | 4/2006 | Floyd | | JP | 11 232919 | 8/1999 |
| 2006/0077148 A1 | 4/2006 | Gally | | JP | 2000 075293 | 3/2000 |
| 2006/0077149 A1 | 4/2006 | Gally | | JP | 2000/075293 | 3/2000 |
| 2006/0077153 A1 | 4/2006 | Cummings | | JP | 2000 193933 | 7/2000 |
| 2006/0077154 A1 | 4/2006 | Gally | | JP | 2000193933 | 7/2000 |
| 2006/0077509 A1 | 4/2006 | Tung et al. | | JP | 2000 514568 | 10/2000 |
| 2006/0077510 A1 | 4/2006 | Chui et al. | | JP | 2000 305074 | 11/2000 |
| 2006/0077512 A1 | 4/2006 | Cummings | | JP | 2001 305312 | 10/2001 |
| 2006/0077522 A1 | 4/2006 | Kothari | | JP | 2001305312 | 10/2001 |
| 2006/0126142 A1 | 6/2006 | Choi | | JP | 2001 343514 | 12/2001 |
| 2006/0132383 A1 | 6/2006 | Gally | | JP | 2001/343514 A | 12/2001 |
| 2006/0181903 A1 | 8/2006 | Okuwaki | | JP | 2002-090549 | 3/2002 |
| 2006/0198013 A1 | 9/2006 | Sampsell | | JP | 2002 245835 | 8/2002 |
| 2006/0209384 A1 | 9/2006 | Chui et al. | | JP | 2002/245835 | 8/2002 |
| 2006/0262279 A1 | 11/2006 | Miles | | JP | 2003-057652 | 2/2003 |
| 2006/0274400 A1 | 12/2006 | Miles | | JP | 2003 066451 | 3/2003 |
| 2007/0201234 A1 | 8/2007 | Ottermann | | JP | 2003 131215 | 5/2003 |
| 2007/0229936 A1 | 10/2007 | Miles | | JP | 2003131215 | 5/2003 |
| 2008/0049450 A1 | 2/2008 | Sampsell | | JP | 2003 177336 | 6/2003 |
| 2008/0112039 A1 | 5/2008 | Chui | | JP | 2003 188959 | 7/2003 |
| 2008/0151347 A1 | 6/2008 | Chui | | JP | 2003188959 | 7/2003 |
| 2009/0190373 A1 | 7/2009 | Bita et al. | | JP | 2003 315732 | 11/2003 |
| 2009/0201565 A1 | 8/2009 | Bita et al. | | JP | 2003315694 | 11/2003 |
| 2009/0231877 A1 | 9/2009 | Mienko | | JP | 2004 206049 | 7/2004 |
| 2009/0251752 A1 | 10/2009 | Gruhlke | | KR | 2002/010322 A | 2/2002 |
| | | | | WO | WO 95/01584 A1 | 1/1995 |
| FOREIGN PATENT DOCUMENTS | | | | WO | WO 95/14256 A1 | 5/1995 |
| | | | | WO | WO 95/30924 A1 | 11/1995 |
| DE | 3402746 A1 | 8/1985 | | WO | WO 96/08833 | 3/1996 |
| DE | 196 22 748 | 12/1997 | | WO | WO 97/01240 | 1/1997 |
| DE | 196 22 748 A1 | 12/1997 | | WO | WO 97/16756 | 5/1997 |
| DE | 102 28 946 | 1/2004 | | WO | WO 97/17628 A1 | 5/1997 |
| DE | 10228946 A1 | 1/2004 | | WO | WO 98/32047 | 7/1998 |
| EP | 0139755 | 10/1983 | | WO | WO 98/35182 | 8/1998 |
| EP | 0366117 | 5/1990 | | WO | WO 99/52006 A2 | 10/1999 |
| EP | 0389031 A1 | 9/1990 | | WO | WO 99/52006 A3 | 10/1999 |
| EP | 0590511 | 4/1994 | | WO | WO 99/63394 A1 | 12/1999 |
| EP | 0667548 A1 | 8/1995 | | WO | WO 01/81994 | 11/2001 |
| EP | 0786911 A2 | 7/1997 | | WO | WO 02/06858 | 1/2002 |
| EP | 0822441 A2 | 2/1998 | | WO | WO 02/24570 A1 | 3/2002 |
| EP | 0830032 A2 | 3/1998 | | WO | WO 02/071132 A2 | 9/2002 |
| EP | 0855745 A | 7/1998 | | WO | WO 03/007049 A1 | 1/2003 |

| | | |
|---|---|---|
| WO | WO 03/038509 | 5/2003 |
| WO | WO 03/056876 | 7/2003 |
| WO | WO 03/056876 A2 | 7/2003 |
| WO | WO 03/069413 A1 | 8/2003 |
| WO | WO 03/073151 A1 | 9/2003 |
| WO | WO 03/075207 A2 | 9/2003 |
| WO | WO 03/105198 A1 | 12/2003 |
| WO | WO 2004/003643 | 1/2004 |
| WO | WO 2004/006003 A1 | 1/2004 |
| WO | WO 2004/026757 A2 | 4/2004 |
| WO | WO 2004/027514 A2 | 4/2004 |
| WO | WO 2004/036270 A1 | 4/2004 |
| WO | WO 2004/068460 A1 | 8/2004 |
| WO | WO 2005/011012 | 2/2005 |
| WO | WO 2005/076051 | 8/2005 |
| WO | WO 2005/088367 | 9/2005 |
| WO | WO 2006/036451 | 2/2006 |
| WO | WO 2006/036496 | 4/2006 |
| WO | WO 2006/036588 | 4/2006 |
| WO | WO 2008/027275 | 3/2008 |
| WO | WO 2008/045224 | 4/2008 |
| WO | WO 2008/045311 | 4/2008 |
| WO | WO 2008/045462 | 4/2008 |
| WO | WO 2008/045463 | 4/2008 |
| WO | WO 2009/102731 | 8/2009 |

OTHER PUBLICATIONS

"Science and Technology", The Economist, May 22, 1999, pp. 89-90.
Akasaka, "Three-Dimensional IC Trends", Proceedings of IEEE, vol. 74, No. 12, pp. 1703-1714, (Dec. 1986).
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K., et al., "Surface micromachined tuneable interferometer array," Sensors and Actuators, pp. 17-23. (1994).
Conner, "Hybrid Color Display Using Optical Interference Filter Array," SID Digest, pp. 577-580 (1993).
Fan et al., "Channel Drop Filters in Photonic Crystals", Optics Express, vol. 3, No. 1, 1998.
Giles et al., "Silicon MEMS Optical Switch Attenuator and Its Use in Lightwave Subsystems", IEEE Journal of Selected Topics in Quantum Electronics, vol. 5. No. 1, Jan./Feb. 1999,pp. 18-25.
Goossen et al., "Possible Display Applications of the Silicon Mechanical Anti-Reflection Switch," Society for Information Display (1994).
Goossen et al., "Silicon Modulator Based on Mechanically-Active Anti-Reflecton Layer with 1Mbit/sec Capability for Fiber-in-the-Loop Applications," IEEE Photonics Technology Letters, pp. 1119, 1121 (Sep. 1994).
Gosch, "West Germany Grabs the Lead in X-Ray Lithography," Electronics pp. 78-80 (Feb. 5, 1987).
Hohlfeld et al., "Micro-Machined Tunable Optical Filters With Optimized Band-Pass Spectrum", 12th International Conference on Transducers, Solid-State Sensors, Actuators and Microsystems, vol. 2, pp. 1494-1497, (Jun. 8-12, 2003).
Howard et al., "Nanometer-Scale Fabrication Techniques", VLSI Electronics: Microstructure Science, vol. 5, pp. 145-153 and pp. 166-173 (1982).
Ibbotson, et al. "Comparison of XeF2 and F-atom Reactions with Si and SiO2," Applied Physics Letters. vol. 44, No. 12, Jun. 1984. pp. 1129-1131.
Jackson "Classical Electrodynamics", John Wiley & Sons Inc., pp. 568-573, date unknown.
Jerman et al., "A Miniature Fabry-Perot Interferometer Fabricated Using Silicon Micromaching Techniques," IEEE Electron Devices Society (1998).
Jerman et al., "A Miniature Fabry-Perot Interferometer with a Corrugated Silicon Diaphragm Support". (1988).
Joannopulos et al., Photonic Crystals, "Molding the Flow of Light", Copyright 1995.

Johnson "Optical Scanners", Microwave Scanning Antennas, vol. 1, p. 251-261, (1964).
Kim et al., "Control of Optical Transmission Through metals Perforated With Subwavelength Hole Arrays", Optic Letters, vol. 24, No. 4,Feb. 15, 1999, pp. 256-257.
Light over Matter, Circle No. 36 (Jun. 1993).
Lin et al., "Free-Space Micromachined Optical Switches for Optical Networking", IEEE Journal of Selected Topics in Quantum Electronics, vol. 5, No. 1, Jan./Feb. 1999, pp. 4-9.
Little et al., "Vertically Coupled Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-3/1996.
Manzardo et al., "Optics and Actuators for Miniaturized Spectrometers," International Conference on Optical MEMS, 12(6):23-24 (Dec. 2003).
Mehregany et al., "MEMS Applications in Optical Systems", IEEE/LEOS 1996 Summer Topical Meetings, pp. 75-76, (Aug. 5-9, 1996).
Miles, et al. Digital paper for Reflective displays, Journal of the Society for Information Display, San Jose, CA vol. 11 No. 1, 2003.
Miles, Interferometric Modulation: MOEMS as an enabling technology for high-performance reflective displays, Proceedings of the SPIE, 4985:28, pp. 131-139, Jan. 2003.
Miles, Mark, W., "A New Reflective FPD Technology Using Interferometric Modulation", The Proceedings of the Society for Information Display (May 11-16, 1997).
Miles, MW "A MEMS Based Interferometric Modulator (IMOD) for Display Applications" Proceedings of Sensors Expo, Oct. 21, 1997 © 1997 Helmer's Publishing, Inc., pp. 281-284 XP009058455.
Nagami et al., "Plastic Cell Architecture: Towards Reconfigurable Computing For General-Purpose", IEEE, 0-8186-8900-5/98, pp. 68-77.
Newsbreaks, "Quantum-trench devices might operate at terahertz frequencies", Laser Focus World (May 1993).
Oliner, "Radiating Elements and Mutual Coupling," Microwave Scanning Antenna, vol. 2, 131-157 and pp. 190-194 (1966).
Raley et al., "A Fabry-Perot Microinterferometer for Visible Wavelengths," IEEE Solid-State Sensor and Actuator Workshop, Hilton Head, SC, pp. 170-173 (1992).
Schankenberg, et al. "Tmahw Etchants for Silicon Micromachining". 1991 International Conference on Solid State Sensors and Actuators—Digest of Technical Papers. pp. 815-818.
Sperger et al., "High Performance Patterned All-Dielectric Interference Colour Filter for Display Applications", SID Digest, pp. 81-83, (1994).
Stone, "Radiation and Optics, An Introduction to the Classical Theory", McGraw-Hill, pp. 340-343, (1963).
Tai, C.Y. et al., "A Transparent Front Lighting System for Reflective-type Displays," 1995 SID International Symposium Digest of Technical Papers, Orlando, May 23-25, 1995, SID International Symposium Digest of Technical Papers, Santa Ana, SID, US vol. 26, May 23, 1995. pp. 375-378, XP000657155.
Walker, et al., "Electron-beam-tunable Interference Filter Spatial Light Modulator", Optics Letters vol. 13, No. 5, pp. 345-347, (May 1988).
Williams, et al. "Etch Rates for Micromachining Processing", Journal of Microelectromechanical Systems. vol. 5 No. 4, Dec. 1996, pp. 256-269.
Winters, et al., "The Etching of Silicon with XeF2 Vapor". Applied Physics Letters, vol. 34. No. 1, Jan. 1979, pp. 70-73.
Winton, John M., "A novel way to capture solar energy", Chemical Week, (May 1985).
Wu, "Design of a Reflective Color LCD Using Optical Interference Reflectors", Asia Display '95, pp. 929-931, (Oct. 1995).
Zhou et al., "Waveguide Panel Display Using Electromechanical Spatial Modulators" SID Digest, vol. XXIX, 1998.
Search Report—Austrian patent Office, May 9, 2005.
Goossen, K.W., "MEMS-Based Variable Optical Interference Devices" Lucent Technologies, Bell Laboratoreis, Room 4B-519, Holmdel, NJ.

Huang, et al., "Multidirectional Asymmetrical Microlens-Array Light Control Films for High Performance Reflective Liquid Crystal Displays", SID Digest, 2002, pp. 870-873.
Obi, et al., "Fabrication of Optical MEMS in Sol-Gel Materials" IEEE, May 2002 p. 39-40.
Austrian Search Report for U.S. Appl. No. 11/036,965 (Publication No. 2005/0179977).
Austrian Search Report for U.S. Appl. No. 11/040,824 (Publication No. 2006/077522).
ISR and Written Opinion for PCT/US2005/031238 dated Dec. 14, 2005 (PCT Publication No. WO 2006/036451).
ISR and Written Opinion for PCT/US2007/018639 dated Mar. 20, 2008 ; PCT Publication No. WO 2008/027275).
Office Action in U.S. Appl. No. 11/040,824 mailed Dec. 15, 2006.
Amendment and Response to Office Action in U.S. Appl. No. 11/040,824 dated Mar. 14, 2007.
Office Action in U.S. Appl. No. 11/040,824 mailed Jun. 5, 2007.
Amendment and Response to Office Action in U.S. Appl. No. 11/040,824 dated Sep. 4, 2007.
Office Action in U.S. Appl. No. 11/040,824 mailed Nov. 19, 2007.
Amendment and Response to Office Action in U.S. Appl. No. 11/040,824 dated Apr. 21, 2008.
Extended European Search Report in European Application No. 05255647.9 mailed Mar. 12, 2008 (European Publication EP 1 640314).
ISR and Written Opinion for PCT/US2005/002986 filed Feb. 2, 2005 (PCT Publication No. WO 2005/076051).
Official Communication from PRC (China) Patent Office in PRC (China) Application No. 200510103554.5 mailed Mar. 28, 2008.
Donald C. O'Shea et. al., "Diffractive Optics: Design, Fabrication & Test," SPIE—International Society for Optical Engineering, 2003, pp. 66-75.
Official Communication from Mexican Patent Office in Mexican Application No. PA/a/2005/010243 mailed Apr. 21, 2008.
Partial International Search Report for PCT/US2007/021623 dated May 13, 2008 PCT Publication No. WO 2008/045463).
Partial International Search Reprot for PCT/US2007/021622 dated May 13, 2008 PCT Publication No. WO 2008/045462).
Partial International Search Report for PCT/US2007/021376 dated Mar. 27, 2008 PCT Publication No. WO 2008/045311).
Neal, T.D., et. al., "Surface Plasmon Enhanced Emission From Dye Doped Polymer Lasers", Optics Express, Optical Society of America, USA, vol. 13, No. 14, Jul. 11, 2005.
International Search Report for PCT/US2007/021376 dated Jun. 2, 2008 PCT Publication No. WO 2008/045311).
Office Action Mailed Dec. 7, 2005 RU Pat. App. No. 2005129954.
European Search Report Mailed Feb. 8, 2006 European Pat. App. No. 052557711.3.
Office Action Mailed Oct. 12, 2006 European Pat. App. No. 05255711.3.
Extended European Search Report in European Pat. App. No. 05255711.3 dated Jan. 25, 2006.
Official Communication in Chinese App. No. 200510103554.5 dated Dec. 19, 2008.
International Search Report and Written Opinion for International App. No. PCT/US2007/020999 (Publication No. WO 2008/045224) dated Apr. 8, 2008.
International Search Report and Written Opinion for International App. No. PCT/US2007/021623 (Publication No. WO 2008/045463) dated Oct. 22, 2008.
International Search Report and Written Opinion for International App. No. PCT/US2007/021622 (Publication No. WO 2008/045462) dated Oct. 22, 2008.
Office Action in U.S. Appl. No. 11/040,824 dated Jul. 31, 2008.
Amendment and Response dated Oct. 31, 2008 in U.S. Appl. No. 11/040,824.
Notice of Allowance in U.S. Appl. No. 11/040,824 dated Jan. 30, 2009.
Official Communication in European App. No. 05255647.9 dated Feb. 27, 2009.
Official Communication in Chinese App. No. 200510105063 dated May 30, 2008.
Office Action in U.S. Appl. No. 11/432,724 dated Apr. 13, 2007.
Amendment and Response in U.S. Appl. No. 11/432,724 dated Jul. 13, 2007.
Final Office Action in U.S. Appl. No. 11/432,724 dated Sep. 11, 2007.
Amendment and Response in U.S. Appl. No. 11/432,724 dated Oct. 31, 2007.
Office Action in U.S. Appl. No. 11/432,724 dated Dec. 21, 2007.
Amendment and Response in U.S. Appl. No. 11/432,724 dated Apr. 21, 2008.
Office Action in U.S. Appl. No. 11/432,724 dated Jul. 28, 2008.
Amendment and Response in U.S. Appl. No. 11/432,724 dated Jan. 27, 2009.
Office Action in U.S. Appl. No. 11/432,724 dated Mar. 3, 2009.
Office Action in Japanese App. No. 2005-226115 dated May 12, 2009.
International Search Report and Written Opinion in PCT/US2007/021376 (International Publication No. WO 2008/045311) dated Jun. 18, 2008.
Partial International Search Report and invitation to pay fees in PCT/US2009/033698 dated May 29, 2009.
Office Action in Japanese App. No. 2005-226115 mailed May 12, 2009.
RCE and IDS in U.S. Appl. No. 11/040,824 dated Apr. 29, 2009.
Official Communication from Mexican Patent Office in Mexican Application No. PA/a/2005/010243 mailed Apr. 21, 2008.
Official Communication from PRC (China) Patent Office in Chinese Application No. 200510103554.5 mailed Mar. 28, 2008.
International Search Report and Written Opinion in PCT/US2005/033056 (International Publication No. WO 2006/036588) dated Jan. 30, 2006.
International Search Report and Written Opinion in PCT/US2009/048677 dated Sep. 11, 2009.
Official Communication in Chinese Application No. 200510103554.5 dated Jul. 3, 2009.
Notice of Allowance and Fee(s) Due in U.S. Appl. No. 11/040,824 dated Jul. 27, 2009.
Office Action in U.S. Appl. No. 11/432,724 dated Sep. 14, 2009.
Request for Continued Examination and Response to the Final Office Action in U.S. Appl. No. 11/432,724 dated Aug. 31, 2009.
International Search Report and Written Opinion in PCT/US2009/033698 (Publication No. WO 2009/102731) dated Oct. 9, 2009.
International Search Report and Written Opinion in PCT/US2009/040561 dated Jul. 17, 2009.
Amendment, Summary of Interview, and Response in U.S. Appl. No. 11/432,724 (Publication No. US 2006-0262279 A1) dated Dec. 14, 2009.
Official Communication in European Application No. 05 255 711.3, dated Feb. 26, 2010.
EP Search Report for Co-Pending EP application No. EP 05 25 5711, dated Jan. 25, 2006.
Search Report—Austrian Patent Office, May 9, 2005.
Huang, et al., "Multidirectional Asymmetrical Microlens-Array Light Control Films for High Performance Reflective Liquid Crystal Displays", SID Digest, 2002, pp. 870-873.
Obi, et al., "Fabrication of Optical MEMS in Sol-Gel Materials" IEEE, May 2002 p. 39-40.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

SYSTEM AND METHOD OF REDUCING COLOR SHIFT IN A DISPLAY

CROSS REFERENCE TO RELATED APPLICATIONS

This application claims priority to, and hereby incorporates by reference the entire disclosure of, U.S. Provisional Application No. 60/613,482, filed on Sep. 27, 2004.

FIELD

The field of the invention relates to microelectromechanical systems (MEMS).

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment is a display system for displaying an image. The display system includes a plurality of interferometric modulators configured to modulate light incident on a surface thereof. The display system further includes a converging optical element positioned with respect to a surface of at least one of the plurality of interferometric modulators such that a focal length of the optical element is greater than a distance between the optical element and the surface.

Another embodiment is a method of fabricating a display system. The method includes forming a plurality of interferometric modulators on a first substrate. The method further includes forming a converging optical element on a second substrate. The optical element is positioned with respect to at least one surface of at least one of the plurality of interferometric modulators such that a focal length of the optical element is greater than a distance between the optical element and the at least one surface. Another embodiment is a display system fabricated according to this method.

Another embodiment is a display system for displaying an image. The display system includes means for interferometrically modulating light incident thereon and means for converging light adapted so as to limit color shift of at least a portion of the image between different viewing locations.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout.

In preferred embodiments, the invention includes an optical element, such as a lens, fresnel lens, diffractive optical element, or binary optical element, positioned between an interferometric display and a viewer of the display. The optical element is configured to reduce color shift that may be seen as the viewing angle or light angle changes.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
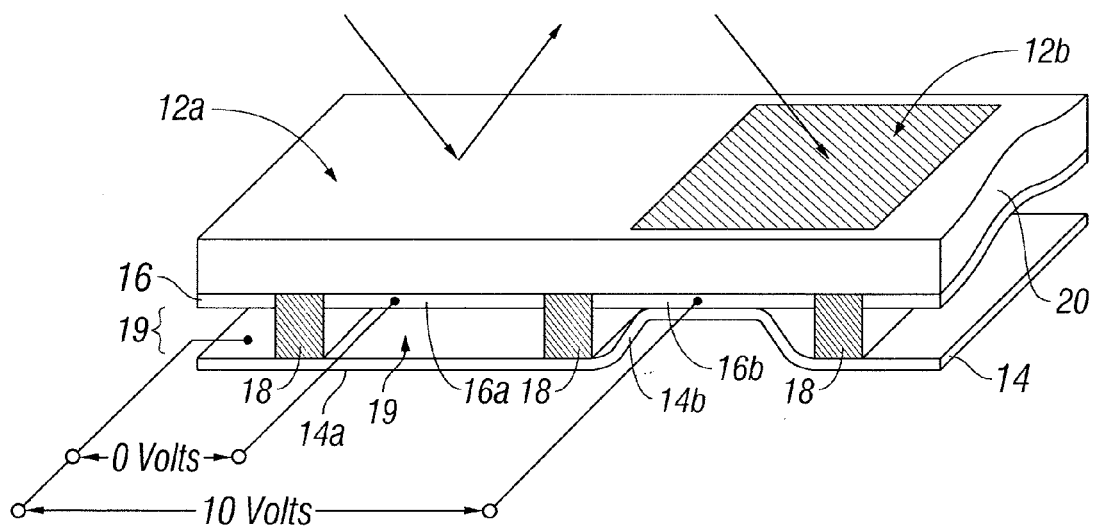
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
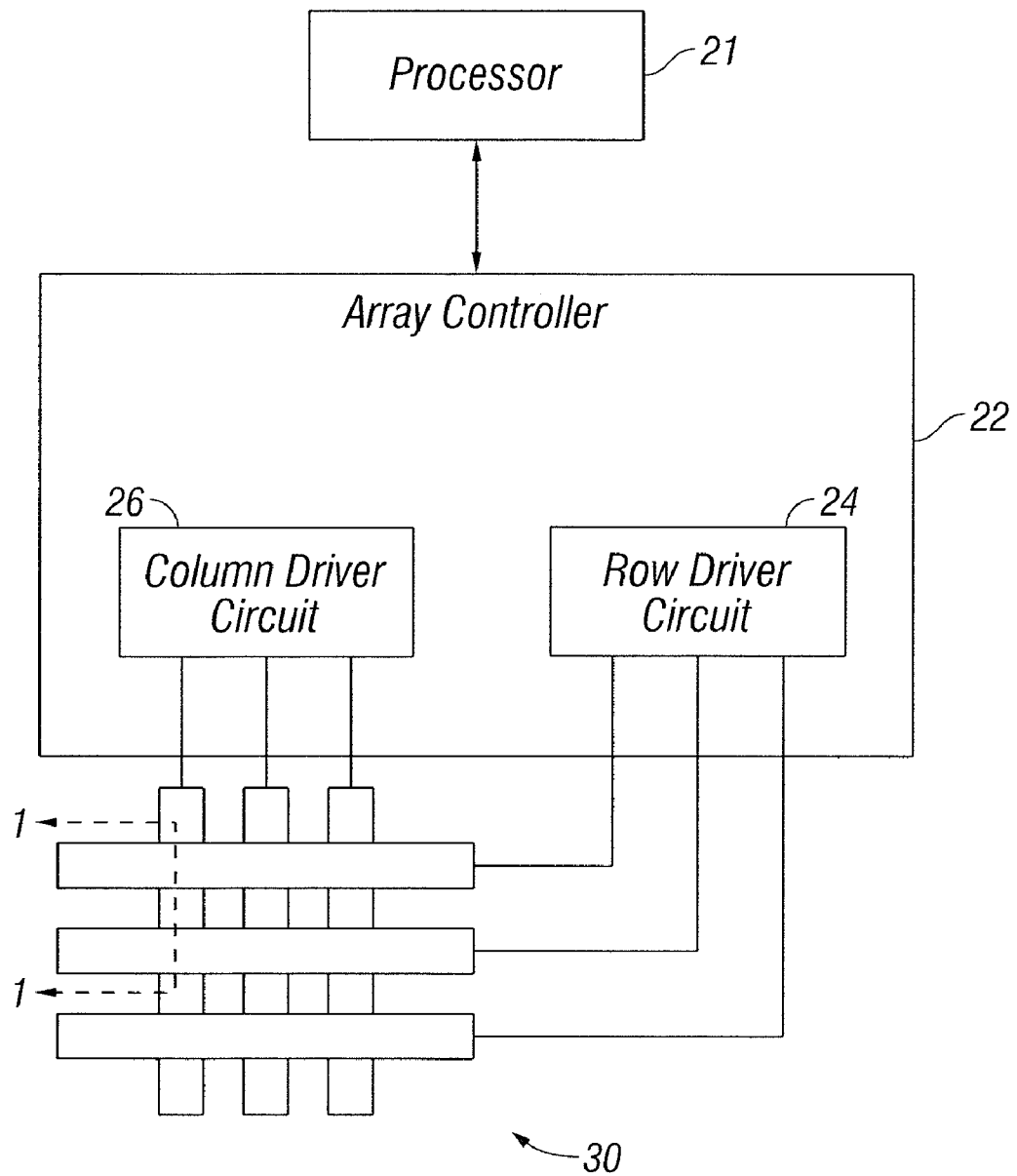
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
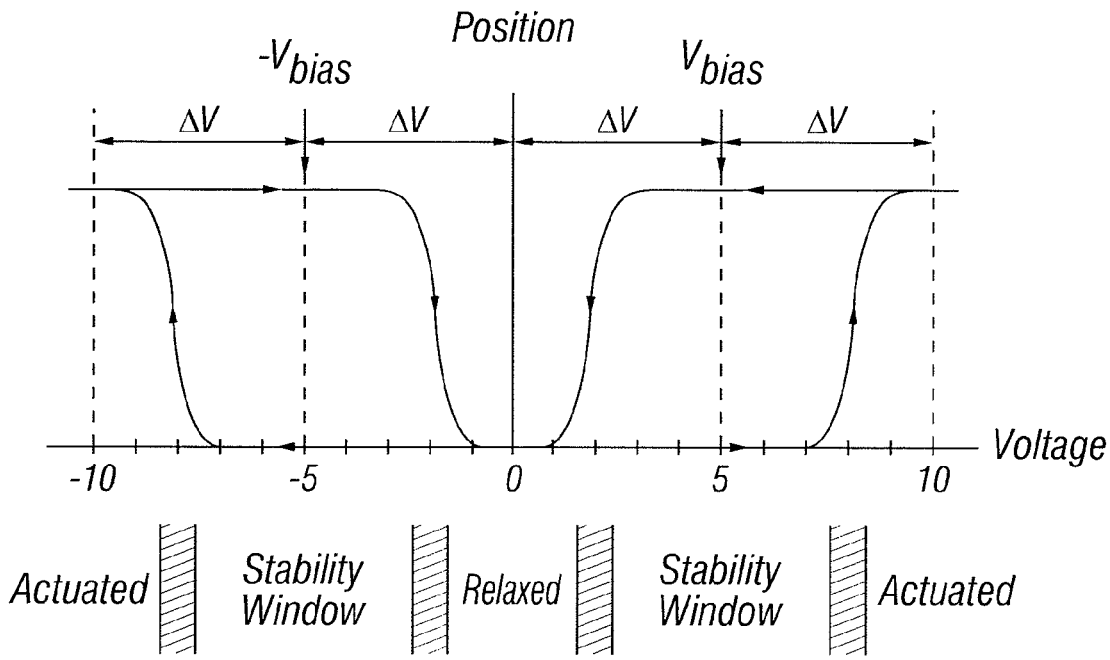
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
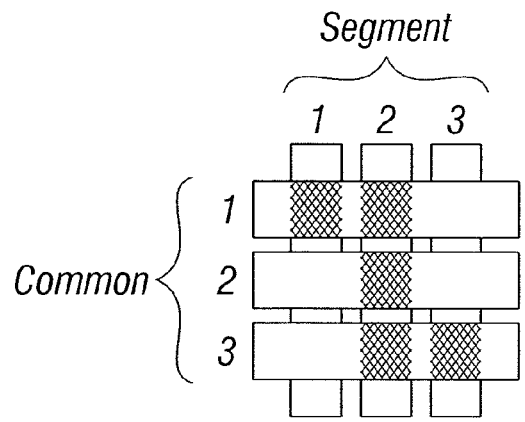
FIGS. 5A and 5B illustrate one exemplary timing diagram for row and column signals that may be used to write a frame of display data to the 3×3 interferometric modulator display of FIG. 2.
Figure 5B:
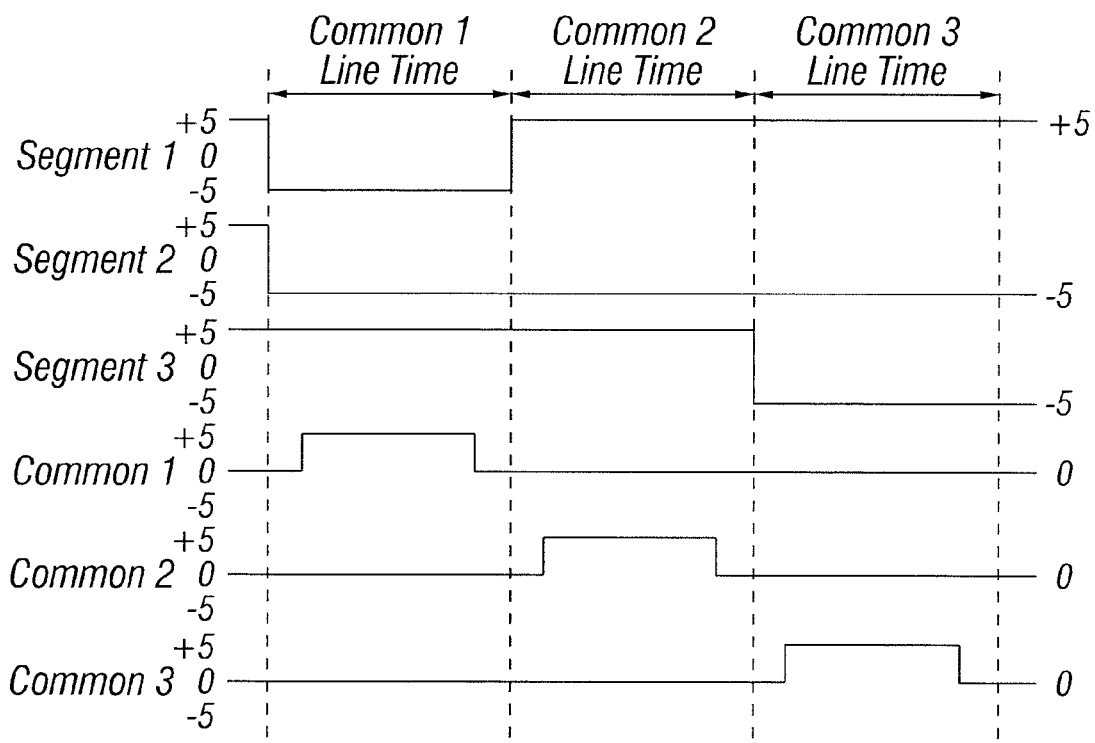

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
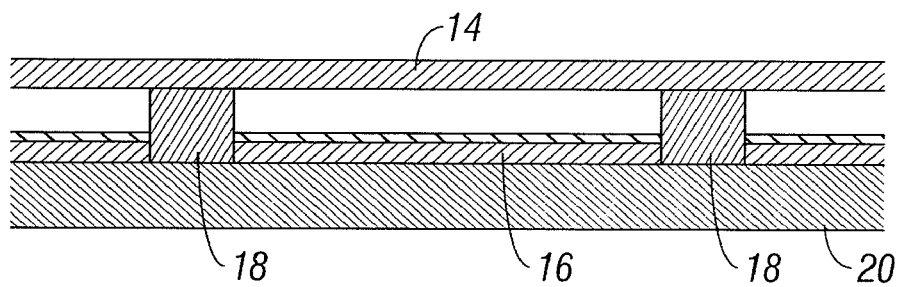
FIG. 6A is a cross section of the device of FIG. 1.
Figure 6B:
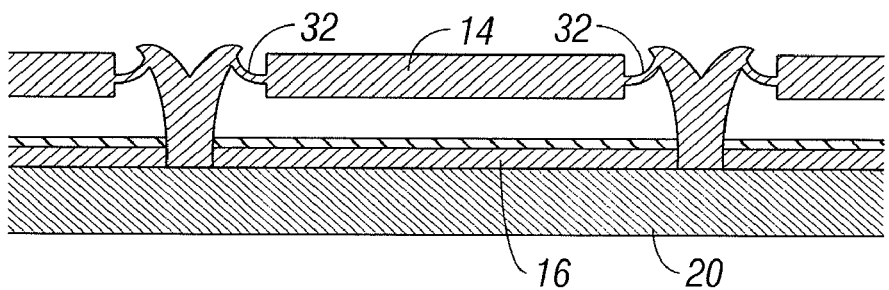
FIG. 6B is a cross section of an alternative embodiment of an interferometric modulator.
Figure 6C:
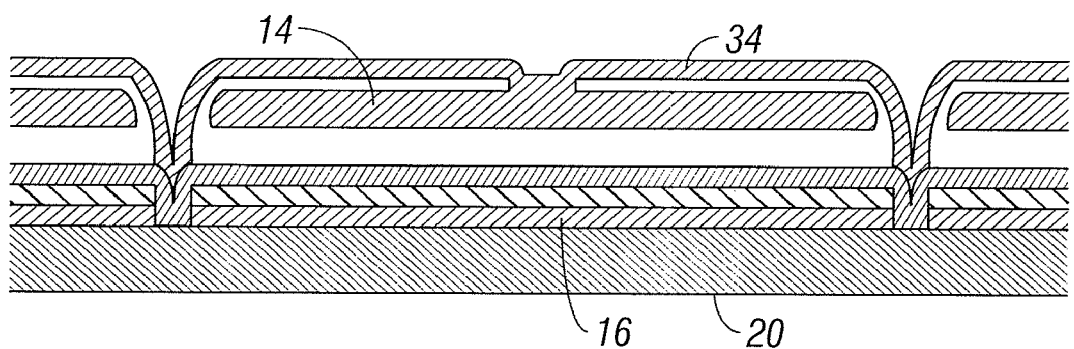
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
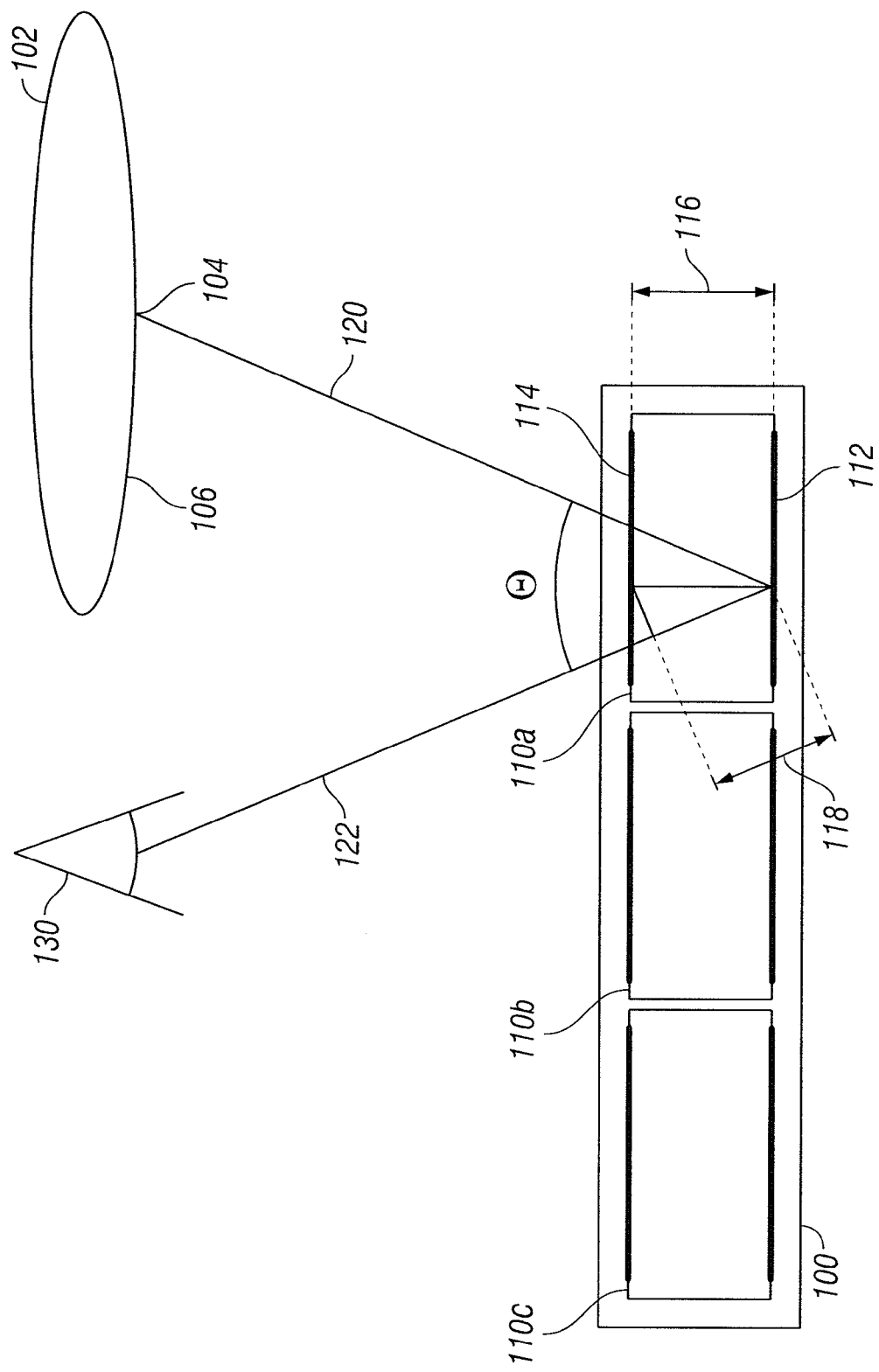
FIG. 7 is a schematic side profile view of one embodiment of an interferometric modulator display depicting the optical path from a light source to a viewer via an interferometric modulator element of the display.

FIG. 7 is a schematic side profile view of one embodiment of an interferometric modulator display 100 depicting an optical path from a light source 102 to a viewer 130 via the display 100. The light source 102 depicted in FIG. 7 transmits light from a range of locations that include, for example, locations 104 or 106. The interferometric modulator display 100 includes an array of the interferometric light modulators 110a, 110b, 110c. Although an array of three light modulators is depicted in FIG. 7, embodiments of the display 100 may include thousands or millions of modulators. Each of the light modulators 110a, 110b, and 110c includes a pair of mirrors 112 and 114. The mirrors 112 and 114 are positioned substantially parallel to each other and are spaced apart at a distance 116 so as to define an optical cavity therebetween. The color of light that is reflected from the optical cavity is at least partly determined by the distance 116. In an exemplary embodiment of the display 100 that is configured to produce a color image, the distance 116 is selected for each of the light modulators 110a, 110b, 110c so that each light modulator 110a, 110b, 110c reflects light substantially of a particular color, for example, red, blue, or green. In other embodiments, the distance may be substantially the same for all modulators 110 in the display 100.

In one embodiment, the display 100 produces a displayed image by reflecting light that arrives at the display 100 along many optical paths from many sources. In one exemplary optical path, the light from location 104 arrives at the display 100 along the path 120. This light is modulated by the interferometric modulator element 110a so that a portion of the light along path 120 is reflected along a path 122 to the viewer 130. The incident and reflected light along paths 120 and 122 define an angle θ with respect to each other. Light traveling from the source 102 to the viewer 130 that is reflected from mirror 114 travels a shorter path (not shown) than does light traveling from the source 102 to the viewer 130 that is reflected from mirror 112. The path length difference between these two paths, along with several other factors, determines the peak wavelength of light that the viewer 130 perceives as being reflected from the modulator element 110a. This path length difference is roughly proportional to the cosine of the angle θ/2 multiplied times the distance 116. For θ=0, cos θ/2=1, and the path length difference is twice the distance 116. As the angle θ becomes larger cos θ/2 decreases, and the path length distance (twice the distance 118) defined by the two mirrors 112 and 114 for light following paths 120 and 122 thus effectively becomes shorter than twice the distance 116. This decreased optical path distance 118 generated in the modulator element 110a corresponds to a shift in the color of light that is reflected by the modulator elements 110a. At sufficiently large angles θ, the viewer 130 can perceive this color shift in the colors produced by the display 120.

Figure 8:
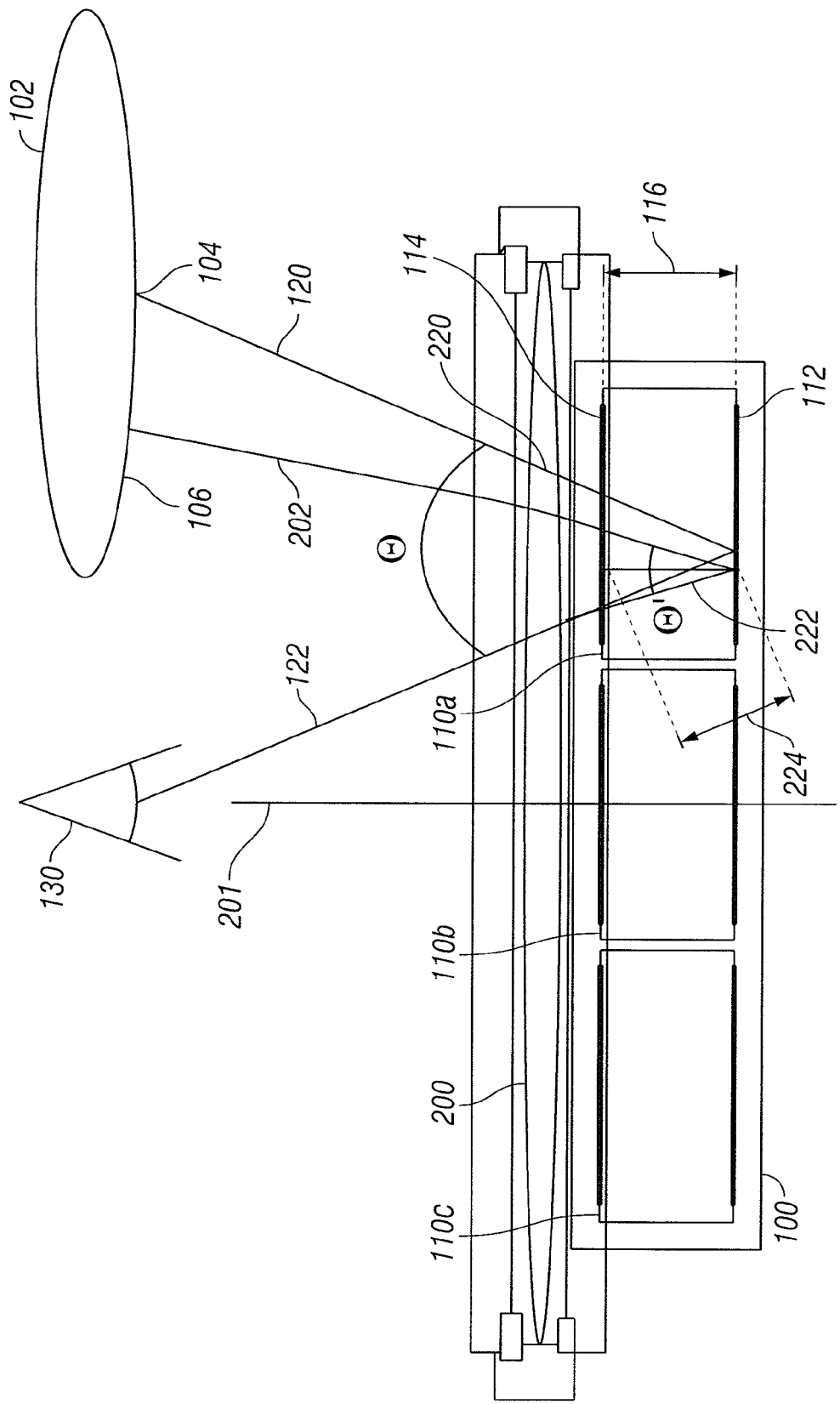
FIG. 8 is a schematic side profile view of another embodiment of the interferometric modulator display, similar to that depicted in FIG. 7, that includes a lens in the optical path from the light source to the viewer via the interferometric modulator element.

FIG. 8 is a schematic side profile view of another embodiment of the interferometric modulator display 100 that includes a converging lens 200 that spans the entire viewing surface of the display 100. The lens 200 is positioned at a distance along the optical axis 201 from the modulators 110 that is less than the focal length of the lens 200. In the embodiment of FIG. 8, which includes the lens 200, one optical path includes a path segment 202 along which light travels from the location 106 to the display 100. In one embodiment, the lens 200 has an optical aperture that is greater than the total aperture of two or more of the interferometric modulators of the display 100. In one embodiment, the lens 200 has an optical aperture that is greater than the total aperture of the array of interferometric modulators. At least a portion of the light from the path segment 202 is transmitted through the lens 200 and reflected via surfaces of the mirrors of the interferometric modulator 110a. The reflected light is again transmitted through the lens 200 to the viewer 130. Conceptually, the lens 200 selects incoming light from a location 106 on the source 102 for transmission through the modulator element 110a to the viewer 130. The optical paths of light to the viewer through the lens 200 are thus selected to have a greater angle of incidence with the reflective surfaces of the modulators (closer to 90°) than the angle of incidence of the optical paths to the viewer in an embodiment without the lens 200. Transmission of this light to the viewer 130 reduces the perceived color shift by altering the path length difference within the optical cavity so that the distance traveled is closer to that followed by light traveling along the optical axis 201.

In one embodiment, the lens 200 is configured to direct light to the viewer 130 substantially via an optical path that includes optical path segments 202, 220, 222, and 122. The source for light traveling along path 202 is location 106 on the source 102. The selected location 106 is closer to the central axis of the display system than is location 104 where the light traveling along path 120 originated. In such an embodiment of the display 100, the narrowing of the illumination source angles is substantially responsible for the steeper angles of the light rays within the modulator elements 110. The reflected path segment 222 and the incident path segment 220 define an angle θ'. The lens 200 is selected so that the angle θ' is smaller than the angle θ defined by the path segments 120 and 122, which correspond to light paths existing in embodiments without the lens 200, as in the display of FIG. 7. The smaller subtended angle θ' at the interferometric modulator element 110a corresponds to a path length difference of twice the distance 224, and since θ' is smaller than θ the path length 224 will be longer than the path length 118 of FIG. 7. The longer path length corresponds to a reduction in the perceived color shift of off-axis light reflected by the display 100.

In one embodiment, the display 100 is a direct-view interferometric display that is viewed using the light source 102 having a broadband, ambient illumination in which substantially all points in the field behind the viewer are similarly illuminated so that light arriving from one source location is on average insignificantly different than light arriving from any other source location. The lens 200 thus selects light from a point in the field that subtends a smaller angle with respect to the viewer 130 than would be selected without the lens 200.

In one embodiment, the converging lens 200 is a convex lens. One of skill in the art can use techniques that are well known in the art to derive the shape and materials for constructing the lens 200 to have the desired characteristic properties. However, in many typical display applications, such as in handheld or other portable display devices, the lens 200 is typically undesirably large and bulky. Moreover, structural support (not shown) for the lens 200 can add cost and complexity to the display 100, and thus tends to render impractical the integration of lens 200 into such a typical product.

As an alternative to the converging lens 200, for example, in order to reduce this bulk, embodiments may include any other suitable converging optical element, including a Fresnel lens. The Fresnel lens is desirably smaller and less bulky than a simple curved lens embodiment such as that shown as the lens 200 in FIG. 8. However, even the reduced bulk of the Fresnel lens still tends to be impractically large for many portable applications. Other embodiments of the lens 200 may include any other type of converging lens or optical element that is known in the art.

An alternative to use of a lens in light control applications is use of diffractive optical elements including holographic optical elements. Diffractive optical elements ("DOE"), which may be considered conceptually to be step-wise approximations to an optical function (for example a Fresnel lens), are light modulating elements that in one embodiment comprise structures that have been patterned and etched onto a substrate using photolithographic techniques so as to diffract light in a predetermined manner, for example, to converge or focus light. In one embodiment, the dimensions of the structures are a few microns in size, depending on the wavelength of the light to be affected. A suitable computer program is typically used to calculate the pattern and shape of the structures that define a DOE to perform a particular optical function, e.g., of a converging lens. Examples of such software include CODE V, available from Optical Research Associates, Inc., Pasadena, Calif., OSLO, available from Lambda Research Associates, Inc, Rochester, N.Y., and ZEMAX, available from Focus Software, Tucson, Ariz. For example, more details regarding diffractive optics, including the calculation of a suitable lens structure, may be found in *Diffractive Optics: Design, Fabrication, & Test*, Donald C. O'Shea, Thomas J. Sulski, Alan D. Kathman, Dennis W. Prather (Society of Photo-Optical Instrumentation Engineering 2003).

One type of DOE is a binary optical element ("BOE"). A binary optical element is a diffractive optical element comprising a discrete number of diffractive surfaces. The simplest form is comprised of single step elements, having two diffractive surfaces, such as formed by single lithographic step.

The two surfaces introduce either a 0 or π-phase difference in the incident wavefront. A multilevel binary element includes N levels of material, e.g., as formed by N lithographic steps. The N levels can produce $2^N$ phase levels.

Figure 9:
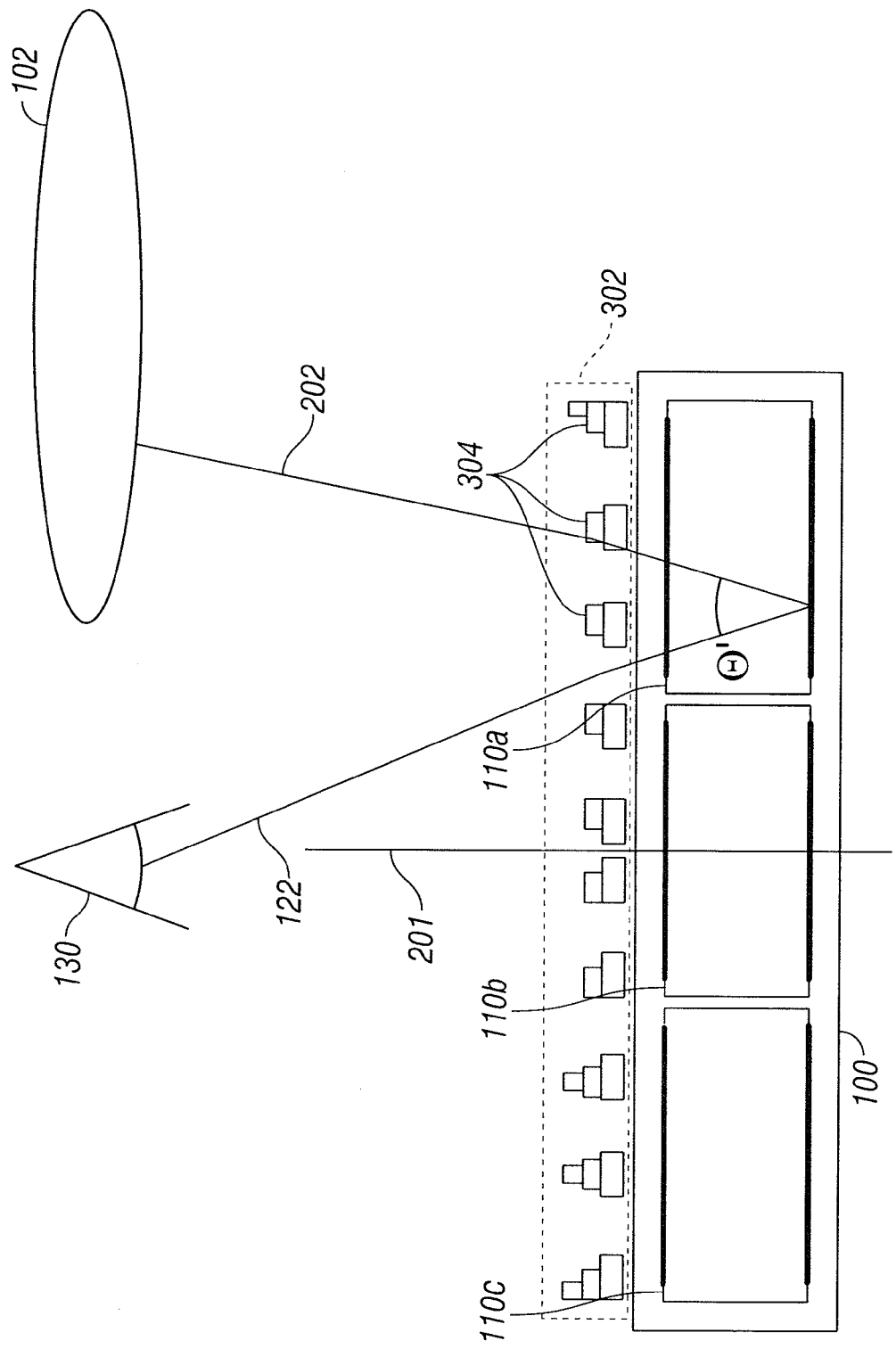
FIG. 9 is a schematic side profile view of another embodiment of the interferometric modulator display, similar to that depicted in FIG. 8, that includes a diffractive optical element in the optical path from the light source to the viewer via the interferometric modulator element.

FIG. 9 is a schematic side profile view of an embodiment of the interferometric modulator display 100 that includes a diffractive optical element 302 in the optical path from the location 106 of the light source 102 to the viewer 130 via the interferometric modulator element 110a. The illustrated embodiment of the DOE 302 is a binary optical element having N=3. In other embodiments, N may be any number. In some embodiments, N may be 1, 2, 3, 4, or 5. In other embodiments, N may be in the range of 1-10.

The DOE 302 includes a converging DOE. A converging DOE is a DOE that is configured to perform the optical function of a converging lens, i.e., converge light toward the optical axis 201 of the DOE 302. It is to be recognized that the elements depicted in each of FIGS. 7-10 are not drawn to scale nor intended to be accurate illustrations of any structure for performing the optical functions attributed to the elements. The diffractive optical element (DOE) 302 typically includes a large number of small elements 304. Each of the elements 304 includes a stack of one or more elements. Some such elements 304 may be define a staircase-like shape. As discussed above, the size and position of the elements 304 are typically calculated using a computer and suitable software. In one embodiment, the elements are arranged in a pattern that defines a set of concentric circular rings. In another embodiment, the elements 302 are grouped into local structures that collectively accomplish the optical functions described herein. The elements 304 can be formed using photolithographic techniques using suitable materials such as photoresist, hardened photo resist (e.g., hard baked in an oven), silica, fused silica, or plastics. In one embodiment, a series of layers of material having a particular thickness and index of refraction are deposited and etched to form the elements 304 of the DOE 302. Thus, as with the lens 200, the DOE 302 selects light rays originating from the location 106 of the light source 102. At least a portion of this light is reflected by the interferometric modulator element 110a along the path segment 122 to the viewer 130.

In one embodiment, the DOE 302 is formed on a separate substrate that is attached to the display 100. In one embodiment, the separate substrate includes a film. The display 100 may include a diffuser (not shown) for scattering the specular light reflected by the interferometric modulator elements 110a in a generally lambertian pattern. In one embodiment, the diffuser includes the DOE 302. In another embodiment, the DOE 302 is formed on the same substrate as the interferometric modulators 110a, 110b, and 110c of the display 100. For example, the interferometric modulators 110a, 110b, and 110c may be formed on a glass substrate. In one embodiment, each of the interferometric modulators 110 110a, 110b, and 110c is formed on a first side of the glass substrate and the DOE 302 is formed on the opposite side of the glass substrate.

In another embodiment, the DOE 302 is formed on the same side of the substrate as the modulators 110. In one such embodiment, the elements 304 are formed on the substrate and covered with a planarization layer. The interferometric modulators 110 110a, 110b, and 110c are then formed on the planarization layer. In one embodiment, the planarization material has an index of refraction that is different from the index of refraction of the material used to make the diffractive elements 304. The pattern of the diffractive elements 304 in the DOE 302 is calculated based on the indices of refraction of both the material forming the diffractive elements 304 and the material forming the planarization layer.

Figure 10:
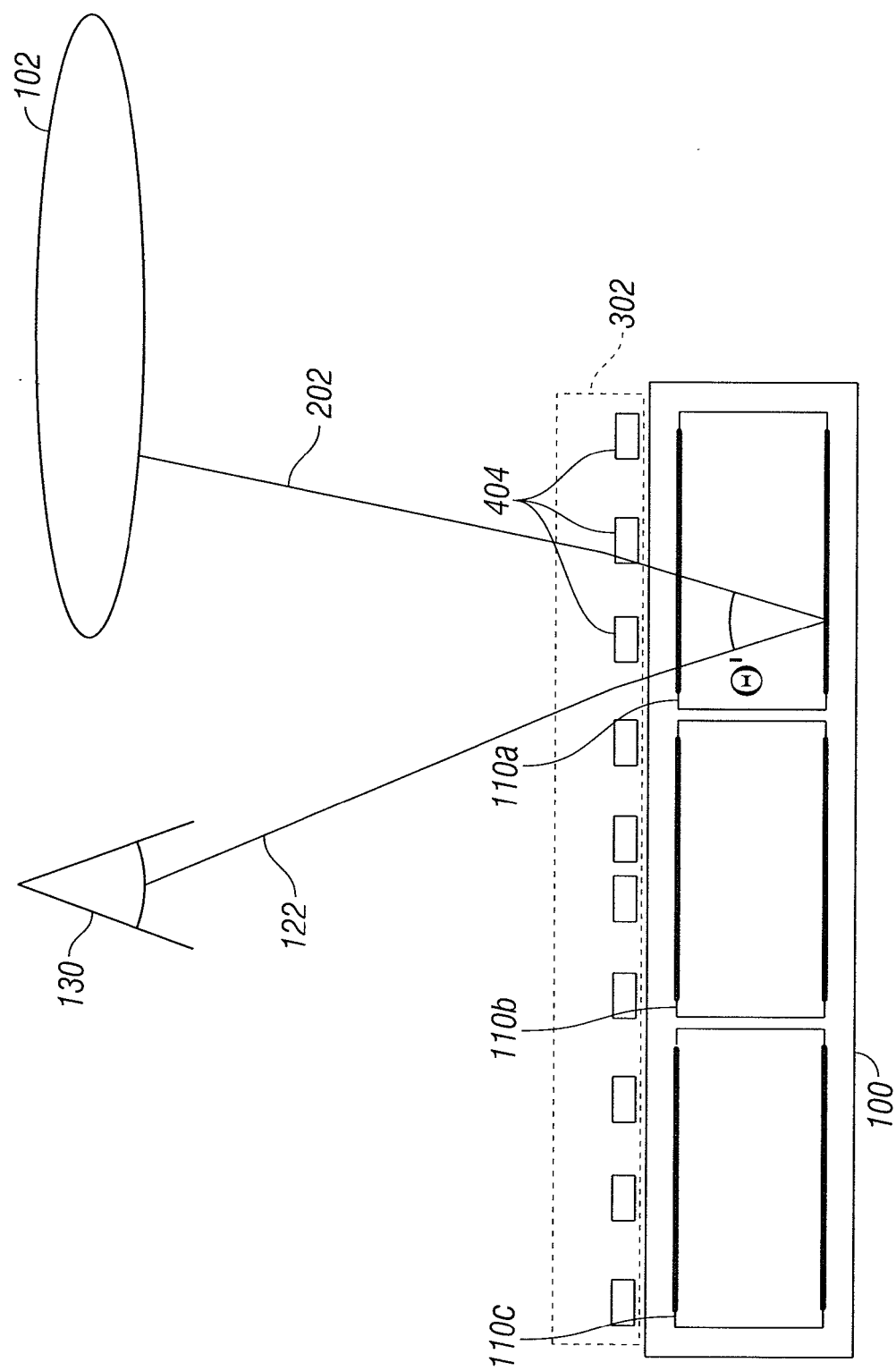
FIG. 10 is a schematic side profile view of another embodiment of the interferometric modulator display, similar to that depicted in FIG. 8, that includes a single level binary optical element in the optical path from the light source to the viewer via the interferometric modulator element.

In one embodiment, the diffractive optical element 302 is formed of a simple, N=1, binary optical element. FIG. 10 is a schematic side profile view of another embodiment of the interferometric modulator display 100 that includes an embodiment of the DOE 302 having N=1 in the optical path from the location 106 of the light source 102 to the viewer 130 via the interferometric modulator element 110a. The embodiment of the DOE 302 in FIG. 10 is created by use of a set of BOE structures 404 that generally are formed to have approximately the same height or thickness as each other. Although the exemplary DOE 302 of FIG. 10 is depicted as having uniformly spaced structures 404, the width and the spacing of the structures 404 may be adjusted to achieve the desired optical function. In the illustrated embodiment, the DOE 302 may be formed from a single layer of material that is photolithographically patterned and etched. Such an embodiment of the DOE 302 is formed in fewer steps than the embodiment of the multi-level binary optical element 302 of FIG. 9. The single level DOE 302 may be placed in different positions and on different substrates and planarized in the same ways as described above for the multiple level DOE 302.

Binary optical elements such as DOE 302 define only an approximation of a desired optical function. Generally, the more layers in the binary optical element, the better the approximation of the desired optical function. However, an approximation of the optical functions of the converging lens 200 at least partially reduces the color shift of the light from the light source 102 that is reflected by the interferometric modulator 110a to the viewer 130. In some embodiments, this partial reduction in color shift is sufficient to improve the perceived color accuracy of the display 100 for off-axis light sources and off-axis viewing.

Embodiments of the DOE 302 may be formed in relation to the display 100 as with any of the embodiments described above with respect to the DOE 302. For example, the DOE 302 may be formed on a diffuser, on a separate substrate, or on either side of the substrate of the interferometric modulators 110a, 110b, and 110c.

For larger displays, e.g., displays with diagonal sizes of greater than approximately 30 inches, at typical household viewing distances, e.g., a few meters, a viewer may perceive angular color shift of a portion of the display even when positioned at the center of the display. It is to be recognized that embodiments of the optical element, such as the diffractive optical element 302, may be configured to reduce this color shift for at least a portion of the display.

Embodiments of the diffractive optical element 302 may be configured to perform other optical functions. For example, it may be desirable in some embodiments to direct light from the display into a range of preferred viewing positions. Thus, in such embodiments, the diffractive optical element 302 may also be configured to direct light from the display 100 so as to control the field of view, to limit or expand the direction of view of the image, or to control the size of the image. In one embodiment, the optical element includes a lenticular component that is configured to control the field of view of the display horizontally (with reference to a viewer) by directing a portion of the light from the display to a range of angles, e.g., by spreading the light from the display 100 around the horizontal axis of the display 100. In one embodiment, the optical element spreads the light through a greater range of angles along the horizontal axis than along the vertical axis. This increase the amount of light received at off axis viewing positions, for example, at a range of seating positions in a room around the display. In one embodiment, the diffractive optical element 302 is further configured to perform the optical function of a lenticular lens.

In another embodiment, the display 100 may include or be configured to use a particular light source or set of light sources having known positions relative to the display 100. In such an embodiment, the diffractive optical element 302 is tailored to direct the light based on the location, amount of illumination, or aperture of the light sources. In one embodiment, the light sources include one or more light emitting diodes positioned around the front of the display 100 so as to illuminate the display. In such an embodiment, the DOE 302 is configured to compensate for non-uniform illumination of the display by the light sources or for the effects of other undesirable properties of the light sources by, for example, varying the amount of light transmitted through the DOE 302 over the surface of the display 100.

In view of the above, one will appreciate that embodiments of the invention overcome many of the problems in the art by providing a interferometric modulator display with an optical element that reduces the color shift evident as viewing angle or light angle change. Moreover, this optical element can be cost-effectively included in the display by the use of a few additional photolithographic steps.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display system for displaying an image, the display system comprising:
   a reflective display comprising a plurality of interferometric modulators configured to modulate light incident on a surface thereof; and
   a converging optical element positioned with respect to a surface of at least one of the plurality of interferometric modulators such that a focal length of the optical element is greater than a distance between the optical element and the surface,
   wherein the optical element has a lens aperture greater than a total aperture of two of the plurality of interferometric modulators and
   wherein the optical element is configured to reduce color shift of the image between different viewing locations and
   wherein the color shift results from reflection of light from at least some of the interferometric modulators associated with the image at the different viewing locations.

2. The display system of claim 1, wherein the optical element comprises a diffractive optical element.

3. The display system of claim 2, wherein the optical element comprises a binary optical element.

4. The display system of claim 2, wherein the optical element comprises a diffuser.

5. The display system of claim 1, wherein the optical element has an aperture greater than a total aperture of the plurality of interferometric modulators.

6. The display system of claim 1, wherein the optical element comprises a lenticular lens.

7. The display system of claim 2, wherein the optical element is configured to spread the modulated light differently along a first axis of the display system than along a second axis of the display system.

8. The display system of claim 7, wherein the first axis is a horizontal axis and the second axis is a vertical axis.

9. The display system of claim 2, further comprising:
   a light source, wherein the optical element is configured to compensate for at least one optical property of the light source.

10. The display system of claim 1, further comprising:
    a substrate supporting the plurality of interferometric modulators and supporting the optical element.

11. The display system of claim 10, wherein the substrate is located between the optical element and the plurality of modulators.

12. The display system of claim 10, wherein the optical element is located between the plurality of interferometric modulators and the substrate.

13. The display system of claim 10, wherein the plurality of interferometric modulators are located between the optical element and the substrate.

14. The display system of claim 1, wherein the plurality of interferometric modulators are configured to output colored light.

15. The display system of claim 14, wherein each of the plurality of interferometric modulators is configured to output colored light.

16. A display system for displaying an image, the display system comprising:
    a reflective display comprising a plurality of light modulators, each of said modulators comprising a reflective surface configured to be positioned at a distance from a partially reflective surface; and
    a converging optical element having positive power positioned with respect to the partially reflective surface of at least one of the plurality of light modulators such that a focal length of the optical element is greater than a distance between the optical element and the partially reflective surface,
    wherein the optical element has a lens aperture greater than a total aperture of two of the plurality of light modulators and
    wherein the optical element is configured to reduce color shift of the image between different viewing locations and
    wherein the color shift results from reflection of light from at least some of the light modulators associated with the image at the different viewing locations.

17. The display system of claim 16, wherein the optical element comprises a diffractive optical element.

18. The display system of claim 17, wherein the diffractive optical element comprises a binary optical element.

19. The display system of claim 16, wherein the plurality of light modulators are configured to output colored light.

20. The display system of claim 19, wherein each of the plurality of light modulators is configured to output colored light.

21. The display system of claim 1, wherein the display system has a diagonal size greater than 30 inches.

22. The display system of claim 16, wherein the display system has a diagonal size greater than 30 inches.

* * * * *